Patented Oct. 3, 1944

2,359,512

UNITED STATES PATENT OFFICE 2,359,512

ELASTIC IMPRESSION COMPOSITIONS

George R. Dickson and Irl C. Schoonover, Washington, D. C., assignors to the Government of the United States, as represented by the Secretary of Commerce No Drawing. Application March 17, 1943, Serial No. 479,446

2 Claims. (Cl. 18—47)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to elastic impression compositions for dental and other duplicating purposes.

An object of this invention is to provide a satisfactory substitute for the agar compositions no longer available for dental use.

Another object of this invention is to provide an alginate impression composition that will not deteriorate upon exposure.

A still further object of this invention is to provide an impression composition which when mixed with water preparatory to use does not form a thick paste, but forms a creamy mixture of about the consistency of thin oil, suited for duplicating purposes in much the same manner that the diluted agar compositions are used.

The hydrocolloidal suspensions of agar have been used nearly 20 years, and are recognized as one of the most satisfactory materials available for making impressions where undercuts and complicated contours are to be reproduced accurately in a model.

The restrictions on the use of agar have brought forth numerous substitutes of resin, wax, rubber and agar-like materials, some of which can be used with a fair degree of satisfaction. Some give roughened surfaces. Others deteriorate with age and cannot therefore be stored for any length of time. The elasticity of some so-called elastic impression compositions is decidedly inferior. While such materials may be withdrawn from undercuts and similar shapes, the material does not snap back to the exact contour of the surface being molded.

Among the more promising of these substitutes have been those employing a soluble alginate (a product obtained from kelp) as the principal ingredient to supply the necessary elasticity and perfection of surface detail. These materials are furnished as a powder which upon the addition of water will react chemically and within five to ten minutes will pass through the following stages: plastic to elastic to a fairly rigid state. Except for the shrinkage caused by the gradual loss of water by evaporation, they appear to be suitable for all dental impression work.

The basic ingredients of the materials now on the market are a soluble alginate (sodium, potassium, or ammonium alginate), a calcium compound having a low solubility (anhydrous calcium sulfate), an inert filler material (calcium carbonate, magnesium oxide, calcium sulfate, zinc oxide, etc.) and a small amount of a soluble phosphate, usually trisodium or tripotassium phosphate.

The chemistry involved in the formation of the elastic material is as follows: A soluble alginate dissolved in water will form a soft soluble gel which will mold readily to any shape against which it is pressed. If now this soft gel is converted into an insoluble alginate such as calcium, the gel will then have a certain amount of elasticity and other physical properties such as may be used to take impressions. One difficulty encountered in carrying out this procedure is to devise some means of permitting the soluble gel to form and then to convert it into an insoluble gel in situ. This is accomplished by the addition of calcium salts which are only slightly soluble but which are sufficiently soluble to furnish the necessary calcium ions to convert the soluble gel into an insoluble alginate. There is the further problem even with the insoluble salts of calcium which may be used that they furnish calcium ions too quickly upon being placed in water and therefore produce a premature setting of the gel. This is overcome by the addition of a small amount of a soluble salt (trisodium phosphate) which will form a more insoluble compound of calcium than calcium alginate. In this manner the calcium ions which are formed during the mixing period are effectively removed, thus preventing the premature setting of the gel. The setting time is controlled in the main by the solubility of the calcium salt employed and the quantity of soluble phosphate added. Other factors, however, such as particle size, amount of filler, quantity and temperature of the water added have their influence on the setting time; this is particularly true for the temperature of the water.

Although these materials do give excellent results some difficulties have been encountered in their manufacture and use, one of which has been their tendency to absorb moisture during storage. This results in the premature removal of the soluble phosphate and permits the formation of insoluble gel before mixing is done. Such a material will not cohere and fails to produce a homogeneous gel mass. It is not satisfactory for the taking of impressions. A method of rejuvenating such materials by the addition of a small quantity of trisodium phosphate to the water at the time of mixing has been devised. At least one manufacturer advocates this procedure as he furnishes a small amount of phosphate in tablet form which is dissolved in the water used to prepare the impression material.

As in the case of agar gels the alginate gels will shrink if they are exposed to conditions whereby they may lose water. Furthermore, some of the impression compositions prepared from the alginates have the tendency to give poor surfaces to the stone models poured into them. The surface may be soft or even etched in appearance. This is believed to be caused by the extraction of water from the gel surface by the setting stone or by a reaction between some residual soluble alginate and the stone. In such cases a hardening solution is supplied in which the impression is immersed prior to the pouring of the stone model. While this solution does prevent the formation of poor stone surfaces, it does not in all cases prevent a certain amount of shrinkage through loss of water if the model is not poured promptly. For this reason it is advisable to pour the stone model as soon as possible after the taking of the impression. Wrapping the impression in a damp cloth or immersion in water is not a guarantee against shrinkage.

A comparison of the physical properties of the three trade brands of these materials with the properties of the agar compositions (See table) reveals that with the exception of the value for permanent set under heavy loads they should be satisfactory for taking impressions if the model is poured as soon as possible after the impression is made. If care is taken in pouring the model, there need be no excessive load applied and consequently no danger of distortion from permanent set.

The present invention is concerned with an impression composition having improved properties, particularly the "shelf life" which has been a definite disadvantage where the material is bought in large quantities such as for Army and Navy use. By using insoluble salts of alginic acid or a soluble salt of alginic salt treated in such a manner as to form an insoluble coating of an insoluble alginate or alginic acid, it is possible to compound a material for taking impressions which is superior in many respects to those now in use. These insoluble alginates when mixed with calcium sulfate, can be converted first into a soluble alginate gel, then into an insoluble alginate, provided a small quantity of a soluble salt is present which is capable of forming compounds of calcium more insoluble than calcium alginate, or in the case of alginic acid, a soluble salt which is capable of converting the insoluble alginic acid into a soluble form. Soluble phosphates (trisodium, or tripotassium, etc.) were found to be satisfactory for this purpose.

Alginates that have been treated in such manner as to coat each individual particle with a layer of alginic acid give the best results. These coated particles may be made by the following process: Sodium or potassium alginate is placed in dilute hydrochloric acid having a specific gravity of approximately 1.15 (1 part of concentrated HCl to 1 part water) for approximately one hour, after which the acid is removed by decantation. The treated powder is then thoroughly washed with alcohol (ethyl 95%) and air dried. The entire procedure for treating a pound of alginate should require not more than two hours. This quantity of material is sufficient for about one hundred impressions.

The impression powder is prepared by mixing four grams of this treated alginate (soluble alginate particles coated with insoluble alginic acid) with five grams of calcium sulfate ($CaSO_4.2H_2O$), two grams of magnesium oxide (MgO), one-half gram of borax ($Na_2B_4O.10H_2O$), three grams of trisodium phosphate $$(Na_3PO_4.12H_2O)$$

and five grams of powdered wax (Acrawax C, Glyco Products Co., Inc., 230 King Street, Brooklyn, New York). This is sufficient material when mixed with 40–60 cc. of water for the taking of one full dental impression. All of the ingredients, with the exception of the alginate and wax can be obtained from most chemical companies. They should be purchased in the powdered form (to pass through No. 100 sieve) and U. S. P. grade. If desired, organic dyes and flavors employed in the coloring and flavoring of foodstuffs may be added. No particular mixing equipment is necessary. A rubber mixing bowl used for mixing plastic is ideal. The mixed powder should be poured into the water (temperature 65–75° F.) and thoroughly mixed from 1 to 1½ minutes. The paste formed in this manner is placed in a dental tray (a perforated tray is not essential). The material should be placed in the mouth in not more than three minutes after mixing was started. An insoluble elastic gel will form after 3 or 4 minutes in the mouth after which it can be removed in the usual manner.

The impression will have a smooth glossy surface and will reproduce the finest detail of the oral cavity. The impression is washed in cold water and immersed in a solution prepared by dissolving 20 grams of manganese sulfate ($MnSO_4.4H_2O$) in each 100 cc. of water for 10–15 minutes after which the excess manganese solution is removed from the surface. The impression is then ready for the stone or plaster, and this should be poured as soon as possible for the best results. The manganese solution should be retained as it may be used over and over. Water may be added to replace that lost by evaporation. The manganese solution must be used if smooth hard stone surfaces are desired. The surface of stone poured against the untreated alginate is soft.

It will be observed that the powder on being mixed with water differs from other alginate impression compositions now on the market in that it does not immediately form a thick paste but forms a creamy mixture of about the consistency of thin oil. In this form the material is suited for duplicating purposes in much the same manner that diluted agar compositions have been used. The following procedure is recommended for making duplicate models. The surface to be reproduced is coated with a thin layer of vaseline to prevent the impression composition from adhering to the surface. The model is mounted in an ordinary duplicating flask. The impression material is poured over the model and vibrated to asisst in the removal of trapped air. The impression material for duplicating purposes should be prepared with cold water approximately 50–60° F. as this delays the formation of the gel, provides a more fluid mix, and gives the operator more time for carrying out the necessary operations. The setting time is delayed approximately 10–15 minutes when water at a temperature of 50° is used. After removal of the model, the impression material is placed in the manganese solution for 10–15 minutes at the end of which time it is removed, and the surface dried. It is then ready for pouring of the stone or plaster. Excellent duplicate models have been prepared following this procedure.

Data on the physical properties of the said elastic material are given in the table. A comparison of these data with those given on other similar alginate compounds shows that the material is stronger, has less permanent set, and greater ability to withstand strain under compression.

Other advantages the material has are (1) cost per unit is low; (2) it adheres readily to smooth metal surfaces, and does not therefore require the use of a perforated metal tray; (3) it is satisfactory for making duplicate models in the customary manner; (4) its setting characteristics are such that ample time is available for following the procedure of coating tooth surfaces prior to actual insertion of the bulk of the material to assist in the elimination of air bells; and (5) its fluidity prior to the time gelling begins reduces the chances of trapping air and produces a more homogenous mass.

The following table shows the physical properties of materials prepared from impression compositions including the insoluble alginate of the present invention as compared to previously known types of compositions.

TABLE

*Physical properties of impression materials prepared from agar, soluble compounds of alginic acid and insoluble compounds of alginic acid*

AGAR TYPE

| Lot | Breaking load, grams per cm.² | Strain, per cent | Set, per cent |
|---|---|---|---|
| A | 2,100 | 18.6 | 2.4 |
| B | 2,800 | 17.0 | 0.6 |
| C | >3,500 | 13.9 | 0.8 |

SOLUBLE ALGINATE TYPE

| A | 2,400 | 19.0 | 5.9 |
|---|---|---|---|
| B | >3,500 | 14.1 | 3.8 |
| C | 2,000 | 14.5 | 4.5 |

INSOLUBLE ALGINATE TYPE

| A | >3,500 | 13.6 | 3.8 |
|---|---|---|---|
| B | >3,500 | 12.9 | 3.4 |

SPECIFICATION REQUIREMENTS [1]

| | 2,000 or more | 4 to 20 | 0 to 3 |
|---|---|---|---|

[1] The values given here represent limits set by Federal Specification U-I-496 for hydrocolloidal impression materials.

We claim:

1. An impression and molding composition adapted when mixed with approximately two to three times its weight of water to form a highly fluid mixture and to thereafter form within a few minutes first a water soluble gel and then after a few more minutes to form a water insoluble gel, said composition comprising the following ingredients in substantially the following proportions by weight:

| | Parts |
|---|---|
| Powdered alginate selected from the group consisting of alginic acid, calcium alginate, powdered water soluble alginate coated with alginic acid, and powdered water soluble alginate coated with calcium alginate | 4 |
| Magnesium oxide | 2 |
| Borax | ½ |
| Water soluble phosphate selected from the group consisting of trisodium phosphate and tripotassium phosphate | 3 |
| Powdered wax | 5 |
| Calcium sulfate | 5 |

2. An impression molding and duplicating composition adapted when mixed with from two to three times its weight of water to form a highly fluid mixture of about the consistency of thin oil and to thereafter form a water soluble gel that subsequently becomes a water insoluble gel, said composition comprising the following ingredients in substantially the following proportions by weight:

| | Parts |
|---|---|
| Water soluble alignate coated with water insoluble alginate | 4 |
| Magnesium oxide | 2 |
| Borax | ½ |
| Water soluble phosphate | 3 |
| Powdered wax | 5 |
| Calcium sulfate | 5 |

GEORGE R. DICKSON.
IRL C. SCHOONOVER.